Figure 1:
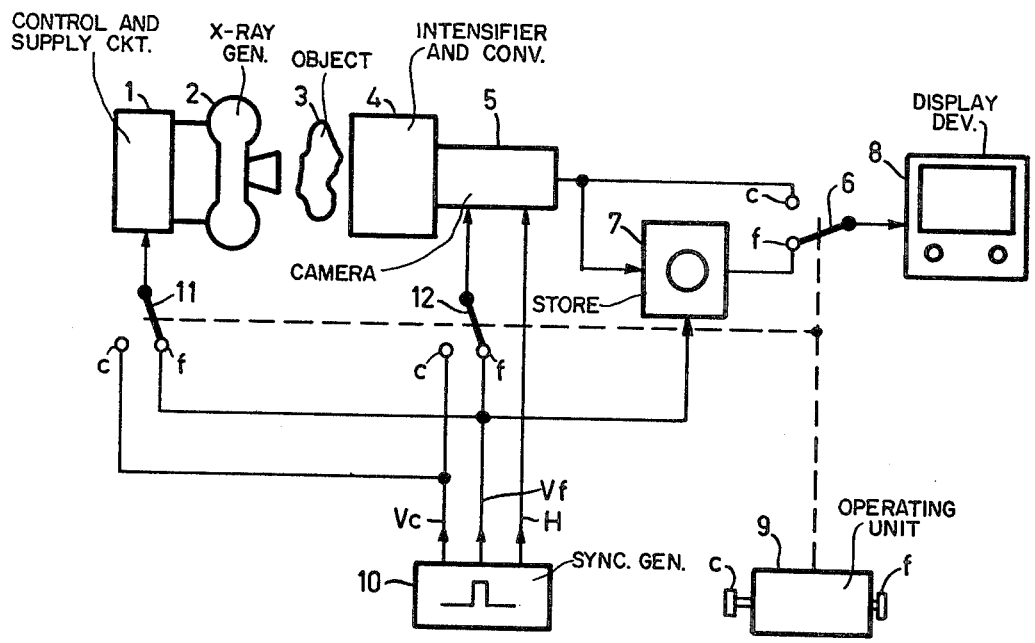

United States Patent [19]

Kemner et al.

[11] 4,017,679

[45] Apr. 12, 1977

[54] TELEVISION PICK-UP AND DISPLAY SYSTEM SUITABLE FOR CONTINUOUS AND SHORT-DURATION INFORMATION PICK-UP AND FOR CONTINUOUS DISPLAY

[75] Inventors: Rudolf Kemner; Joost Egbert Marquerinck, both of Eindhoven, Netherlands

[73] Assignee: U.S. Philips Corporation, New York, N.Y.

[22] Filed: Feb. 27, 1975

[21] Appl. No.: 553,541

[30] Foreign Application Priority Data

Mar. 4, 1974 Netherlands ............. 7402868

[52] U.S. Cl. ............. 358/111; 178/DIG. 5; 358/150

[51] Int. Cl.² ............. H04N 7/18

[58] Field of Search ... 178/DIG. 5, 6.6 R, 69.8 TV, 178/6.8, 69.5 G; 360/9, 10; 331/1 R, 1 A, 16, 20, 51

[56] References Cited

UNITED STATES PATENTS

| | | | |
|---|---|---|---|
| 3,280,253 | 10/1966 | McMaster et al. | 178/6.8 |
| 3,352,968 | 11/1967 | Walter et al. | 178/6.6 |
| 3,582,651 | 6/1971 | Siedband | 178/7.8 |
| 3,679,823 | 7/1972 | Corrigan | 178/6.6 DD |
| 3,745,245 | 7/1973 | Yunde et al. | 178/6.8 |
| 3,758,723 | 9/1973 | Green et al. | 178/6.8 |
| 3,924,064 | 12/1975 | Nomura et al. | 178/6.8 |

*Primary Examiner*—Benedict V. Safourek
*Assistant Examiner*—Edward L. Coles
*Attorney, Agent, or Firm*—Frank R. Trifari; Henry I. Steckler

[57] ABSTRACT

An X-ray television pick-up and display system which is suitable for continuous and short-duration pick-up operation and continuous display. In continuous pick-up operation, in display on a display device an interlaced television picture is composed of two line scanning rasters in a standard manner. In short-duration pick-up operation a synchronizing pulse generator is changed over so that a single line-scanning raster comprising an integral number of lines is obtained for information pick-up, which information is stored in a signal store which for repeated signal supply is connected to the display device. As a result, the picture displayed does not show motional unsharpness and is free from flicker effects.

4 Claims, 2 Drawing Figures

TELEVISION PICK-UP AND DISPLAY SYSTEM SUITABLE FOR CONTINUOUS AND SHORT-DURATION INFORMATION PICK-UP AND FOR CONTINUOUS DISPLAY

The invention relates to a television pick-up and display system suitable for continuous and for short-duration information pick-up and for continuous display, which system comprises a television pick-up device which during each field period is operative using a line scanning raster for information signal generation, a switching device and a signal store which are coupled to the output of the pick-up device, a display device designed according to a standard having two interlaced line scanning rasters which during display constitute a television picture and to which through the switching device the information to be displayed is applied either directly by the pick-up device or via the signal store, and a control circuit for selecting either the continuous or the short-duration pick-up operation.

Such a pick-up and display system is described in U.S. Pat. No. 3,647,954 and in particular for use in X-ray television. It is stated that for the short-duration pick-up operation six field periods are used, after which the information stored in the signal store can repeatedly be derived therefrom for display by the display device. It is self-evident that a continuous pick-up and display operation in normal manner is possible. The operation of the known system for short-duration pick-up is as follows, starting from a given available information which without interruption in display is to be replaced by new information. Whilst during the first two field periods of the short-duration operation the signal store provides the old information for display, the pick-up device is adjusted to information pick-up. In the next two field periods the pick-up device which is engaged in picking up information is directly connected to the display device whilst in the signal store the old information is being erased. In the last two field periods the pick-up device is connected both to the display device for display and to the signal store for information storage. Subsequently the signal store only is connected to the display device to which the information picked up in two interlaced line scanning rasters is repeatedly supplied. The said patent specification further describes the problem of providing synchronisation such as to ensure that during change-over there will be continuous display.

Thus two line scanning rasters which together form an interlaced television picture are stored in the signal store. In this process an X-ray generator is operative during six field periods. Such a time may not be objectionable in the case of an inanimate object, but it may well be so if the object is a living organism the tissues of which are likely to be damaged by X-rays. Furthermore storage of the information of two line scanning rasters or fields which together form an interlaced picture has the disadvantage that if the object performs a rapid movement, in display a motional unsharpness and a flicker phenomenon will occur, for the (repeated) two fields displayed differ by a field period so that any displacement which may occur during this period will result in lack of definition and in flicker effects at frame frequency, which is very disturbing.

A possible solution is to pick up and store only one field which then is repeatedly displayed, during one field directly and during the next field via a delay device having a delay time of one half of a line period, etc. In such a method the display device operates in the standardized manner using two interlaced fields. The use of such an expensive delay device and of a change-over device which switches at the field frequency is a disadvantage.

It is an object of the present invention to provide a television pick-up and display device which does not have the said disadvantages and for this purpose the system according to the invention is characterized in that the pick-up device is connected to a switchable synchronizing pulse generator which forms part of the control circuit for selection of continuous or short-duration pick-up operation, which switchable synchronising pulse generator during short-duration operation, which takes place in a single field period, causes a single line scanning raster to be produced in the pick-up device for information signal generation, which raster has an integral number of lines and hence is different from the standard line scanning raster having a fractional number of lines as used in continuous operation, whilst during short-duration operation the pick-up device is connected to the signal store for storing the information signal generated in the single field period in which the line scanning raster having the integral number of lines is used, after which the display device is connected for signal supply to the repeatedly readable signal store containing the information of the single line scanning raster having the integral number of lines.

A television pick-up and display device suitable for X-ray television in which the pick-up device is provided with an X-ray generator further is characterized in that in short-duration operation for information pick-up the control circuit coupled to the X-ray generator activates this generator for a short time during a blanking period of the pick-up device preceding the information signal generation in the television pick-up device.

Figure 2:
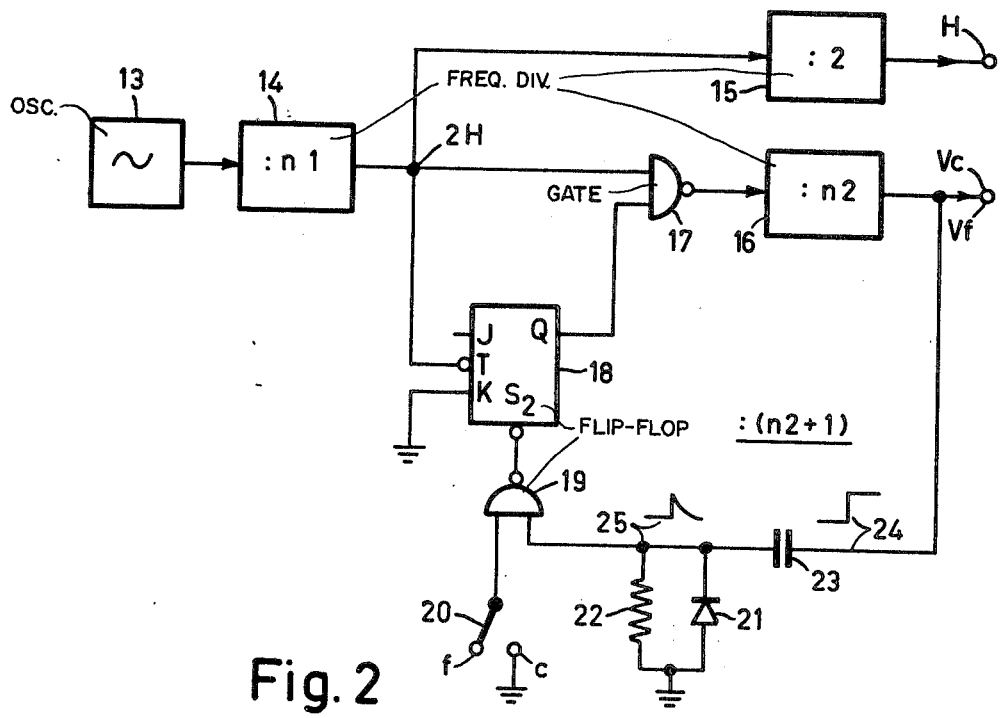

An embodiment of the invention will now be described, by way of example, with reference to the accompanying diagrammatic drawings, in which:

FIG. 1 is a block diagram of a television pick-up and display system according to the invention, and FIG. 2 is a block diagram of an embodiment of a synchronizing pulse generator which is simply switchable and is suitable for use in a system according to the invention.

FIG. 1 shows an embodiment of a television pick-up and display system according to the invention suitable for use in X-ray television. A control and supply circuit 1 is connected to an X-ray tube 2 shown schematically. The resulting X-ray generator (1, 2) is directed for irradiation onto an object 3, and transmitted radiation strikes a radiation converter and image intensifier 4 in which an optical image of the transmitted X-rays is formed. This optical image is picked up by a television pick-up device 5 and converted into a video signal which is available at an output which is connected to a change-over terminal c of a switching device 6 and to an input of a signal store 7. For X-ray processing a X-ray optical pick-up device (4, 5) is used, but alternatively a pick-up device may be used which operates directly, without the intermediate formation of an optical image, and produces the video signal. No details will be given of the design of the pick-up device 5, however, it may comprise a pick-up tube of the vidicon type provided with the required deflecting, focussing and correcting means. A second change-over terminal f of the switching device 6 is connected to the output of a signal store 7, and its pole is connected to the input of a television display device 8. For the sake of simplicity the switching device 6 is shown as a mechanical change-over switch which can be operated from an operating unit 9. The television display device 8 is a standard television monitor, i.e. a monitor designed for operation with two line scanning rasters which together form an interlaced television picture. The (odd) number of the lines which make up the television picture composed of the two interlaced line scanning rasters is irrelevant. The display device 8 operates in the standard manner when it is directly connected to the pick-up device 5 via the terminal c of the switching device 6. For this purpose the X-ray generator (1, 2) and the pick-up device 5 are required to operate in a suitable manner and hence a synchronizing pulse generator 10 having a plurality of outputs is provided which is connected to the X-ray generator (1, 2) through a switching device 11, to the pick-up device 5 through a switching device 12 and to the signal store 7 directly. The switching devices 6, 11 and 12 are operatively connected to the operating device 9. The pulse generator 10 and the switching devices 11 and 12 constitute a switchable pulse generator (10, 11, 12) which forms part of a control circuit (9–12).

The operating device 9 has two operating buttons c and f which enable either continuous operation (c) for the X-ray generator (1, 2) and the pick-up device 5 or short-duration (f) to be selected. In FIG. 1 the system is shown in the condition for short-duration operation (f). The pulse generator 10 then supplies a modified field synchronizing signal Vf to change-over terminals f of the switching devices 11 and 12 for supply to the X-ray generator (1, 2) and to the pick-up device 5. An output of the pulse generator 10 at which a standard field synchronizing signal Vc appears is connected to change-over terminals c of the switching devices 11 and 12. The pulse generator 10 directly supplies the modified field synchronizing signal Vf to the signal store 7 and a standard line synchronizing signal H to the pick-up device 5. The switching device 6 need not be disposed at the location shown in FIG. 1 but may be connected between the signal store 7 and the pick-up device 5, the single pole being connected to the latter.

When televising the inanimate object 3 continuous operation may be selected by means of the operating device 9, the switching devices 6, 11 and 12 being switched to the c position. The generator (1, 2) supplies X-rays, either continuously or pulsatingly, and the pick-up device 5 continuously supplies in successive field periods by means of interlaced line scanning rasters a standard video signal to the standard display device 8. Thus an interlaced television picture is formed in the normal standard manner on the display screen of the device 8 and can be observed during pick-up.

Continuous pick-up is not well possible when the object 3 is a living organism, because prolonged X-ray exposure may give rise to irreparable tissue damage. If such an object 3 is televised the operating device 9 is set to the f position shown in FIG. 1. The application of the modified field synchronizing signal Vf to the X-ray generator (1, 2) results in that this generates radiation for a short time either continuously or pulsatingly. The short-duration X-ray generation may, for example, take place in a blanking period of the pick-up device 5 which precedes the field in which the signal is processed in the pick-up device 5. This blanking period of the pick-up device 5 depends on the thickness of the object 3 and may be from one to one hundred milliseconds. This is of particular importance if in order to prevent tissue damage a short irradiation time is required or if an instantaneous recording is to be made of an object 3 in which rapid changes occur. It should be mentioned that if the object 3 should be capable of withstanding irradiation during several field periods without consequent tissue damage, short-duration irradiation within a field blanking period of about 1 millisecond may be required because of rapid changes in the object 3. In order to enable the various methods of irradiation to be selected as required, the signal Vf applied to the control and supply circuit 1 may include a code signal during, for example, the field blanking period. In such an arrangement the operating device 9 and the pulse generator 10 may be coupled to one another, the irradiation mode selected being transmitted through the coupling.

The modified field synchronizing signal Vf prepares the signal store 7 for recording the video signal supplied by the pick-up device 5. The signal store 7 may be a disc store or a tape store or include a cathode-ray tube store. Which design is used is irrelevant.

The modified field synchronizing signal Vf is essentially different from the standard field synchronizing signal Vc and hence causes a different line scanning raster to be formed in the pick-up device 5 and a modified output video signal to be produced for storage in the signal store 7. Because the number of lines for each interlaced television picture, which according to the standard comprises two line scanning rasters, is odd, the standard field period of the signal Vc contains a fractional number of lines including one half line. By contrast, according to the invention there is applied to the pick-up device 5 a signal Vf which is modified so as to give rise to a line scanning raster comprising an integral number of lines. This number may exceed the standard fractional number of lines by one half line. As a result, the signal store 7 stores a video signal which is at the standard line frequency but has a field period which is longer than the standard by the duration of one half line. After storage in the signal store 7 the video signal is available, for example under the control of the signal Vf, to be repeatedly applied to the (standard) display device 8. If shortly before the instant at which the information signal having the modified line scanning raster is applied to this display device an information signal having the standard line scanning raster was applied to it for display, the field deflection circuit provided in the display device 8, which circuit was synchronized to the latter signal, will become synchronized in a manner adapted to the modified (prolonged) field period. Because the modified field period comprises an integral number of lines, the display device 8 will no longer produce an interlaced television picture but a picture consisting of a single line scanning raster. It was found in practice that the picture quality is sufficient for still images. Alternatively, the standard line number may be increased by one and a half, two and a half etc. lines instead of by one half line. It should be mentioned that normally in a closed pick-up and display system as shown in FIG. 1 the standard line number exceeds that used in public television broadcasting so that a reduction of the said increased line number still will give acceptable pictures.

Instead of the switchable synchronizing pulse generator (10, 11, 12) of FIG. 1, which in order to simplify the explanation of the operation of the pick-up and display system is shown as including switches 11 and 12, the switchable synchronizing pulse generator shown in greater detail in FIG. 2 may be used. In FIG. 2 a signal oscillator 13 is connected to a frequency dividing circuit 14. The oscillator 13 may, for example, be a crystal oscillator having a frequency which is 160 times the line frequency and the frequency dividing circuit 14 may have a divisor $n1 = 80$ so that this circuit 14 delivers a signal 2H at twice the line frequency. Thus the signal 2H of twice the line frequency is supplied by an oscillator circuit (13, 14) and by means of a frequency division circuit 15 having a divisor of two the line synchronizing signal H is derived from it.

The pulse generator of FIG. 2 includes a second frequency division circuit 16 which has a divisor $n2$ and to which through a NOT-AND gate 17 the signal 2H at twice the line frequency is applied. One input of the gate 17 is connected to the Q output of a flip-flop 18 of the JK type. To a trigger input T of the flip-flop 18 the signal 2H is applied, and a preparatory input K is connected to earth, whilst a preparatory input J is isolated and by internal couplings a high signal level or a logical 1 appears at this input. A reset input $S_2$ of the flip-flop 18 is connected to the output of a NOT-AND gate 19. The JK flip-flop 18 is of the type which operates at a low level, i.e. when logical 0 corresponding to earth potential is applied to the T input, the arrangement being such that when logical 1 appears at the J input and logical 0 (earth potential) at the K input the flip-flop 18 will be in a stable state if the Q output carries logical 1. Furthermore, logical 0 applied to the $S_2$ input will dominantly cause logical 0 to appear at the Q output. One input of the gate 19 is connected to a switching device 20 and may at will be connected to an isolated change-over terminal $f$ (logical 1 by internal couplings) or to a terminal $c$ connected to earth (logical 0). The other input of the gate 19 is connected to the cathode of a diode 21 the anode of which is connected to earth. The diode 21 is connected in parallel with a resistor 22, and the junction point of this resistor and the cathode is connected through a capacitor 23 to the output of the frequency division circuit 16. The capacitor 23 and the resistor 22 constitute a signal differentiating circuit (22, 23) connected in a variable feedback loop (17-23).

The operation of the switchable synchronizing pulse generator (13-23) of FIG. 2 is as follows. When the switching device 20 is in the $c$ position logical 0 appears at one input of the gate 19 so that this gate is closed and logical 1 appears at the $S_2$ input of the flip-flop 18. As a result, the flip-flop 18 is released and in the stable state logical 1 appears at the Q output so that the gate 17 is opened. The signal 2H at twice the line frequency is applied in inverted form to the frequency division circuit 16 and if the divisor $n2$ is equal to the standard (odd) number of lines of a television picture the circuit 16 produces the standard field synchronizing signal Vc. Thus the frequency division circuit 16 operates using the fixed divisor $n2$.

If the short-duration operation $f$ has been selected, the switching device 20 is in the $f$ position shown in FIG. 2. As a result the gate 19 is opened. For the time during which a low signal level appears at the output of the divider 16, as shown in a signal 24, the gate 17 is open. Through the signal differentiating circuit (22, 23) the positive-going edge in the signal 24 produces a pulse-shaped signal 25 at the other input of the gate 19. The inverted signal 25 which for a short time, for example, 1 to 2$\mu$s, includes logical 0 is applied to the $S_2$ input of the flip-flop 18, so that logical 0 appears dominantly at the Q output and the gate 17 is closed. When a subsequent logical 0 in the signal 2H reaches the gate 17 the latter is closed, however, this 0 via the T input acts on the (released) flip-flop 18 which returns to the stable state in which logical 1 appears at the Q output. Thus the gate 17 is opened again so that a subsequent pulse (including logical 0) in the signal 2H again reaches the frequency division circuit 16. It will be seen that owing to the operation of the variable feedback loop (17-23) one pulse in the signal 2H does not reach the frequency division circuit 16 having the fixed divisor $n2$ and consequently a frequency division circuit (16-23) provided with feedback is formed which has a divisor ($n2 + 1$) for generating the signal Vf. Because the divisor ($n2 + 1$) is an even number, the modified field synchronizing signal Vf has a field period equal to an integral number of lines.

For the sake of completeness it should be mentioned that when a descending edge occurs in the signal 24 the diode 21 acts as a short circuit.

The generator of FIG. 2 includes a free-running crystal oscillator 13. If, however, a controllable oscillator (13) is used, locking the frequency of the supply mains may be effected by applying the signal Vc or Vf to a frequency-and-phase discriminator, not shown, to which is also applied a signal at mains frequency, the output signal becoming available for control purposes at the controllable oscillator (13). In such an arrangement the field period remains equal to the period of the supply mains both in continuous operation ($c$) and in short-duration operation ($f$), however, the increased number of lines of the modified line scanning raster ($f$) causes the line frequency of the signal H to be correspondingly increased. It will be seen that the pulse generator 10 of FIG. 1 also is assumed to include a crystal oscillator, because it was assumed that the same line synchronizing signal H is produced in continuous operation and in short-duration operation.

In the pulse generator of FIG. 2 the single flip-flop 18 ensures that the number of lines of the modified line scanning raster is increased by one half line compared with the fractional standard line number. It will be clear that the use of a plurality of series-connected flip-flops having interconnected $S_2$ inputs permits of suppressing three, five, etc. pulses from the signal 2H at twice the line frequency which is applied to the frequency division circuit 16, resulting in that the number of lines of the modified line scanning raster is increased by one and a half, two and a half, etc. lines with respect to the fractional standard line number.

Instead of pulse suppression, pulse addition may be used, in which case the number of lines of the modified line scanning raster is smaller by one half, one and a half, etc. lines than the fractional standard line number.

When in the system of FIG. 1 after a short-duration pick-up operation the recorded information has been displayed and viewed for a desired time, another short-duration pick-up operation may be effected, the old information in the signal store 7 being erased or retained whilst the new information is stored in the signal store 7. Depending upon the complete or residual contents of the store various modes of operation are possible.

The television pick-up and display system according to the invention is described by way of example as used in X-ray television. Obviously the television system described may as well be used for other purposes in which both continuous and short-duration pick-up operation is required. For surveillance of grounds and buildings, for example, continuous pick-up operation may be used in daytime and flash-light pick-up operation at night. The flash-light may be infrared radiation, the pick-up device 5 of FIG. 1 handling the incident radiation either directly or via a radiation converter and an image intensifier. Flash-light operation saves energy.

Furthermore continuous operation using direct display may be terminated by short-duration operation for picking up and storing in the signal store 7 information from an image of the object 3. In this method first an image of the object 3 subject to changes is continuously picked up and displayed with interlacing. If it is desired to record an image, standard operation with interlacing is replaced by short-duration operation without interlacing so that, if subsequently the image recorded in the signal store 7 is repeatedly displayed, no motional unsharpness and no flicker effects occur in the picture displayed.

What is claimed is:

1. Television pick-up and display system suitable for continuous and for short-duration information pick-up and for continuous display, which system comprises a television pick-up device means for information signal generation during each field period using a line scanning raster, a repeatedly readable signal store coupled to the output of the pickup device, a display device means for displaying a television picture according to a standard having two interlaced line scanning rasters, a control circuit means coupled to said pick up device and said store for selecting either the continuous or the short-duration pick-up operation, said control circuit comprising a switchable synchronizing pulse generator means coupled to said pick-up device for applying during short-duration operation in a single field period a single line-scanning raster to the pick-up device for information signal generation, which raster has an integral number of lines and for applying to said pick-up device a standard line-scanning raster having a fractional number of lines during continuous operation, and a switching device means coupled to said control circuit for coupling during short-duration operation the pick-up device to the signal store for storing the information signal generated in the single field period in which the line scanning raster having the integral number of lines is used, and for coupling the display device to the repeatedly readable signal store containing the information of the single line scanning raster having the integral number of lines after said single field period.

2. Television pick-up and display system as claimed in claim 1, further comprising an X-ray generator disposed proximate said pick-up device and coupled to said control generator, said generator comprising means during activating said generator for a short time during a blanking period generation in the television pick-up device.

3. Television pick-up and display system as claimed in claim 1, wherein the switchable synchronizing pulse generator included in the control circuit comprises an oscillator circuit means for supplying a signal at twice the line frequency, and a fixed divisor frequency division circuit means coupled to the oscillator circuit for producing the field frequency, said frequency division circuit including an adjustable feedback loop means for changing the fixed divisor of the frequency division circuit by an odd number.

4. Television pick-up and display device as claimed in claim 3, wherein the feedback loop comprises the series connection of a signal differentiating circuit, an adjustable gate circuit, a flip-flop and a second gate circuit, which flip-flop and which second gate circuit are coupled between the oscillator circuit and the frequency division circuit which has the fixed division; whereby a single pulse is suppressed.

* * * * *